(12) United States Patent
Yeh et al.

(10) Patent No.: US 7,910,870 B2
(45) Date of Patent: Mar. 22, 2011

(54) SOLAR TRACKER

(75) Inventors: Hong-Yih Yeh, Taoyuan County (TW); Cheng-Dar Lee, Tainan (TW); Shang-Lee Chyou, Taipei (TW); Pan-Chih Liu, Taoyuan (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 0 days.

(21) Appl. No.: 12/007,152

(22) Filed: Jan. 7, 2008

(65) Prior Publication Data

US 2010/0275903 A1      Nov. 4, 2010

(51) Int. Cl.
*F24J 2/38* (2006.01)
*G01C 21/02* (2006.01)
(52) U.S. Cl. ............ 250/203.4; 356/139.01; 126/578
(58) Field of Classification Search ............ 250/203.4; 356/139.01; 126/578
See application file for complete search history.

(56) References Cited

U.S. PATENT DOCUMENTS

| | | | | |
|---|---|---|---|---|
| 3,996,917 A * | 12/1976 | Trihey | | 126/576 |
| 4,041,307 A * | 8/1977 | Napoli et al. | | 250/203.4 |
| 4,179,612 A * | 12/1979 | Smith | | 250/203.4 |
| 4,225,781 A * | 9/1980 | Hammons | | 250/203.4 |
| 4,297,572 A * | 10/1981 | Carlton | | 250/203.4 |
| 4,314,546 A * | 2/1982 | Miller | | 126/578 |
| 4,349,733 A * | 9/1982 | Beam et al. | | 250/203.1 |
| 4,484,565 A * | 11/1984 | Mori | | 126/578 |
| 5,317,145 A * | 5/1994 | Corio | | 250/203.4 |
| 5,670,774 A * | 9/1997 | Hill | | 250/203.4 |
| 6,297,740 B1 * | 10/2001 | Hill et al. | | 340/600 |
| 6,465,725 B1 * | 10/2002 | Shibata et al. | | 136/246 |
| 6,875,974 B2 * | 4/2005 | Muesch et al. | | 250/203.1 |
| 7,507,941 B2 * | 3/2009 | Yeh et al. | | 250/203.4 |
| 7,795,568 B2 * | 9/2010 | Sherman | | 250/203.4 |
| 2004/0094691 A1 * | 5/2004 | Redler et al. | | 250/203.3 |
| 2008/0041431 A1 * | 2/2008 | Tung | | 135/21 |
| 2008/0066735 A1 * | 3/2008 | Yeh et al. | | 126/578 |
| 2009/0056700 A1 * | 3/2009 | Lin et al. | | 126/605 |
| 2009/0101137 A1 * | 4/2009 | Tsai et al. | | 126/600 |
| 2009/0107486 A1 * | 4/2009 | Tsai et al. | | 126/604 |
| 2010/0275903 A1 * | 11/2010 | Yeh et al. | | 126/578 |

* cited by examiner

*Primary Examiner* — John R Lee
(74) *Attorney, Agent, or Firm* — Jackson IPG PLLC; Demian K. Jackson

(57) ABSTRACT

A solar tracker includes a sunlight-detecting unit, a control unit, a first motor and a second motor. The sunlight-detecting unit detects the position of the sun. Based on the position of the sun, the control unit instructs the first motor to rotate a solar cell array and the second motor to tilt the solar cell array.

18 Claims, 5 Drawing Sheets

SOLAR TRACKER

BACKGROUND OF INVENTION

1. Field of Invention

The present invention relates to a photovoltaic module and, more particularly, to a solar tracker for a photovoltaic module.

2. Related Prior Art

A photovoltaic module includes a solar cell array mounted on a frame and a solar tracker for directing the solar cell array to the sun. Thus, the photoelectric efficiency of the solar cell array can be maximized.

A typical solar tracker includes the follow properties. Firstly, it tracks the brightest object in the sky. Secondly, it includes detectors for detecting the position of the brightest object. Thirdly, its tolerance is 1 to 3 degrees. Fourthly, it includes an analog circuit.

Referring to FIG. 5, as devised by Ronald P. Corio et al., a conventional solar tracker includes a shell 31, a circuit board 32 located in the shell 31 and four photo detectors 33 provided on the shell 31. The shell 31 includes four walls. Each of the photo detectors 33 is located on a related one of the walls of the shell 31. The photo detectors 33 are located at 45 degrees upward. The photo detectors 33 are directed to the east, the west, the south and the north, respectively. Each of the photo detectors 33 detects the brightness of the sunlight and provides a signal corresponding to the brightness. The intensities of the signals from the photo detectors 33 are calculated to determine the position of the sun.

Problems have however been encountered in the use of the conventional solar tracker. Firstly, the tolerance is larger than 0.5 degrees. Among the photovoltaic modules, concentration photovoltaic modules are the most promising ones for high efficiencies. Among the concentration photovoltaic modules, those including III-V solar cells are the most popular ones. For a concentration photovoltaic module, the tolerance must be smaller than 0.1 degrees.

Secondly, the circuit board 32 consumes much energy because it carries an analog circuit.

Thirdly, it is difficult and therefore expensive to provide the photo detectors 33 on the walls of the shells at 45 degrees upwards.

Fourthly, it is not reliable because it could easily be contaminated by water and dirt.

The present invention is therefore intended to obviate or at least alleviate the problems encountered in prior art.

SUMMARY OF INVENTION

It is the primary objective of the present invention to provide a solar tracker for a photovoltaic module.

To achieve the foregoing objective, the solar tracker includes a sunlight-detecting unit, a control unit, a first motor and a second motor. The sunlight-detecting unit detects the position of the sun. Based on the position of the sun, the control unit instructs the first motor to rotate a solar cell array and the second motor to tilt the solar cell array.

The sunlight-detecting unit includes a base. A waterproof joint is inserted through the base. A circuit board is connected to the waterproof joint and formed with ten sockets. An integrated circuit includes ten pins inserted in the sockets and four photo diodes provided thereon for detecting sunlight and providing according signals. A plate is provided on the integrated board. A column is provided on the plate. A hat is mounted on the column. A transparent cover is provided on the base for covering the circuit board, the integrated circuit, the plate, the column and the hat.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 3:
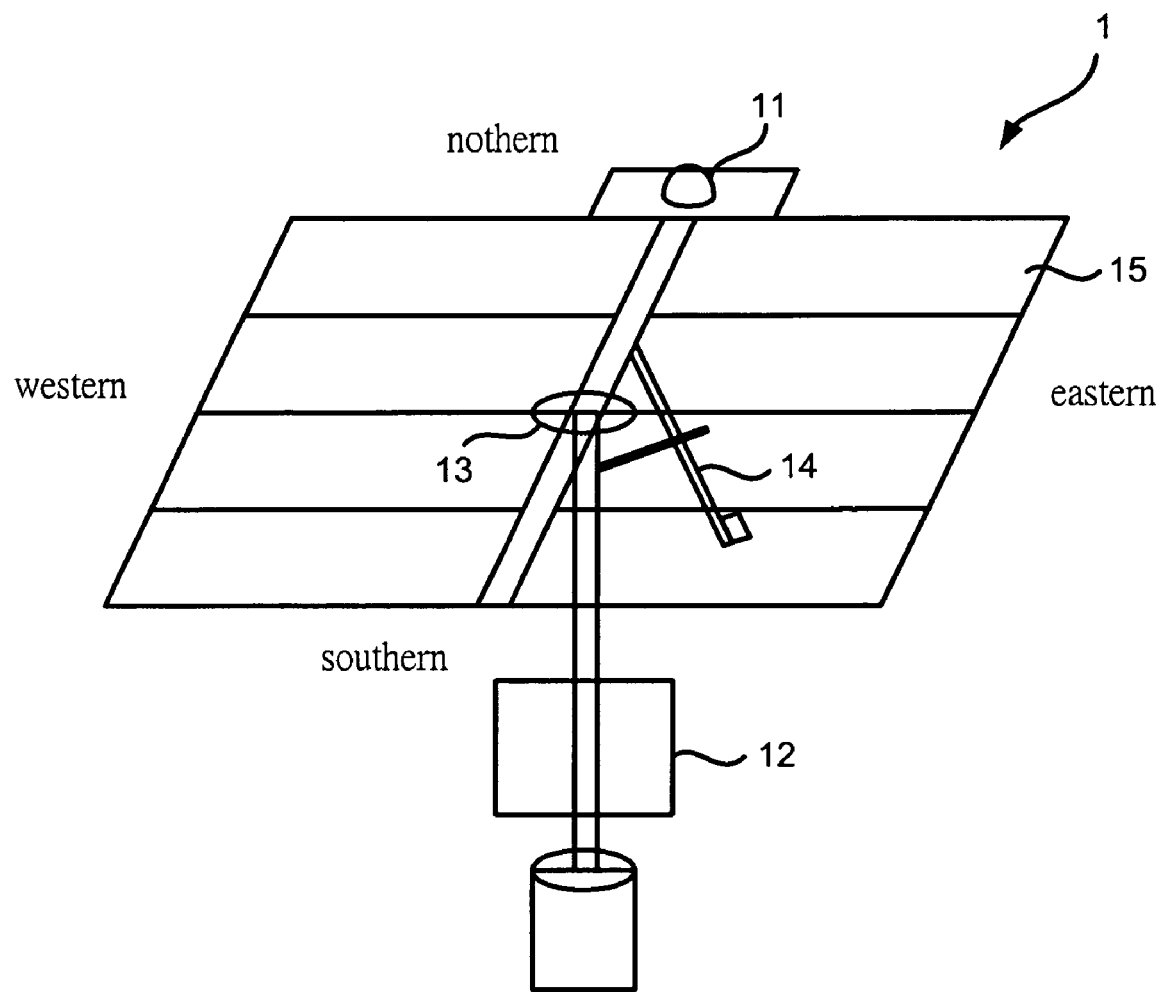
FIG. 3 is a perspective view of a photovoltaic module including the solar tracker shown in FIG. 2.

Referring to FIG. 3, a photovoltaic module includes a solar cell array 15 and a solar tracker 1 according to the preferred embodiment of the present invention. The solar cell array 15 is provided on a beam supported on a post. The beam can be rotated about the post, i.e., about a vertical axis. The term "rotation" will be used to represent the angular motion about the vertical axis. The beam can be tilted on the post, i.e., pivoted about a horizontal axis. The term "tilt" will be used to represent the angular motion about the horizontal axis. Thus, the solar cell array 15 always intercepts the sunlight perpendicularly.

Figure 2:
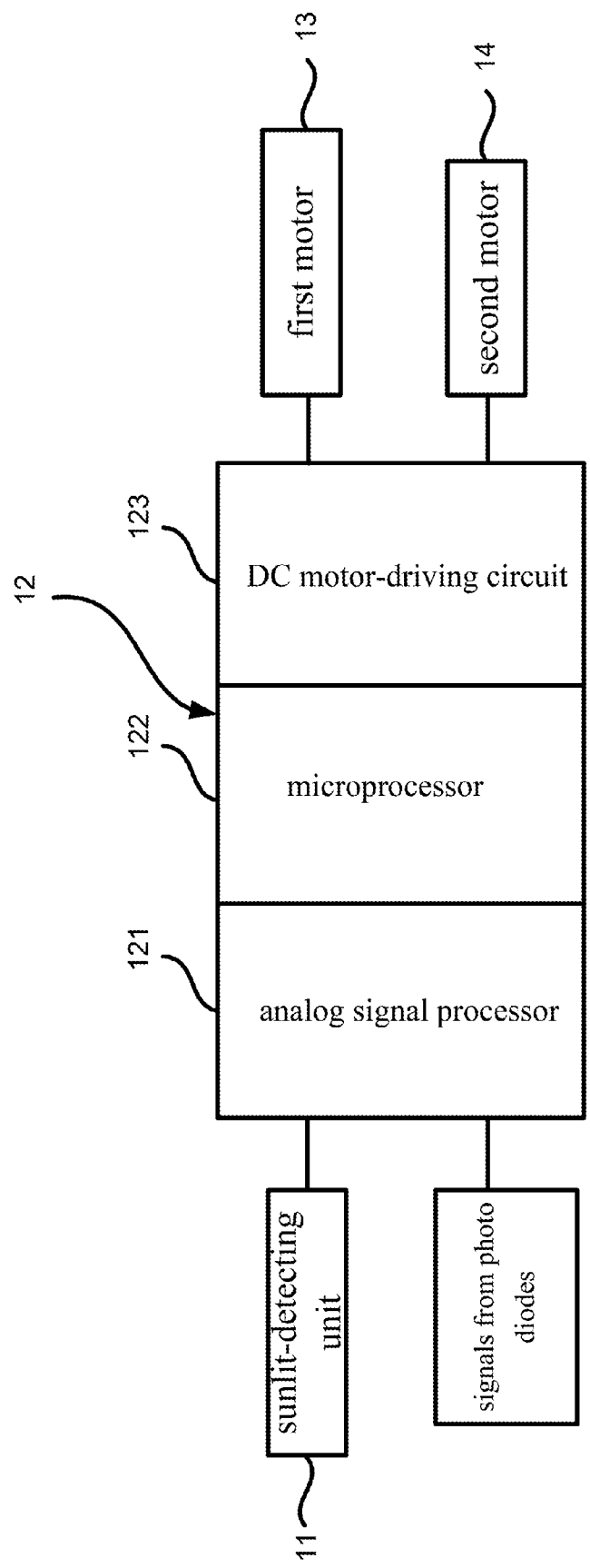
FIG. 2 is a block diagram of a solar tracker including the sunlight-detecting unit shown in FIG. 1.

Referring to FIG. 2, the solar tracker 1 includes a sunlight-detecting unit 11, a control unit 12 connected to the sunlight-detecting unit 11, a first motor 13 connected to the control unit 12 and a second motor 14 connected to the control unit 12. The sunlight-detecting unit 11 detects the sunlight and sends signals to the control unit 12. Based on the signals, the control unit 12 determines the position of the sun. According to the position of the sun, the control unit 12 makes the first motor 13 rotate the solar cell array 15. However, the operation of the first motor 13 will be stopped if the solar cell array 15 is in the eastern or western dead zone. According to the position of the sun, the control unit 12 makes the second motor 14 tilt the solar cell array 15. However, the operation of the second motor 14 is stopped if the solar cell array 15 is in the southern or northern dead zone.

Figure 1:
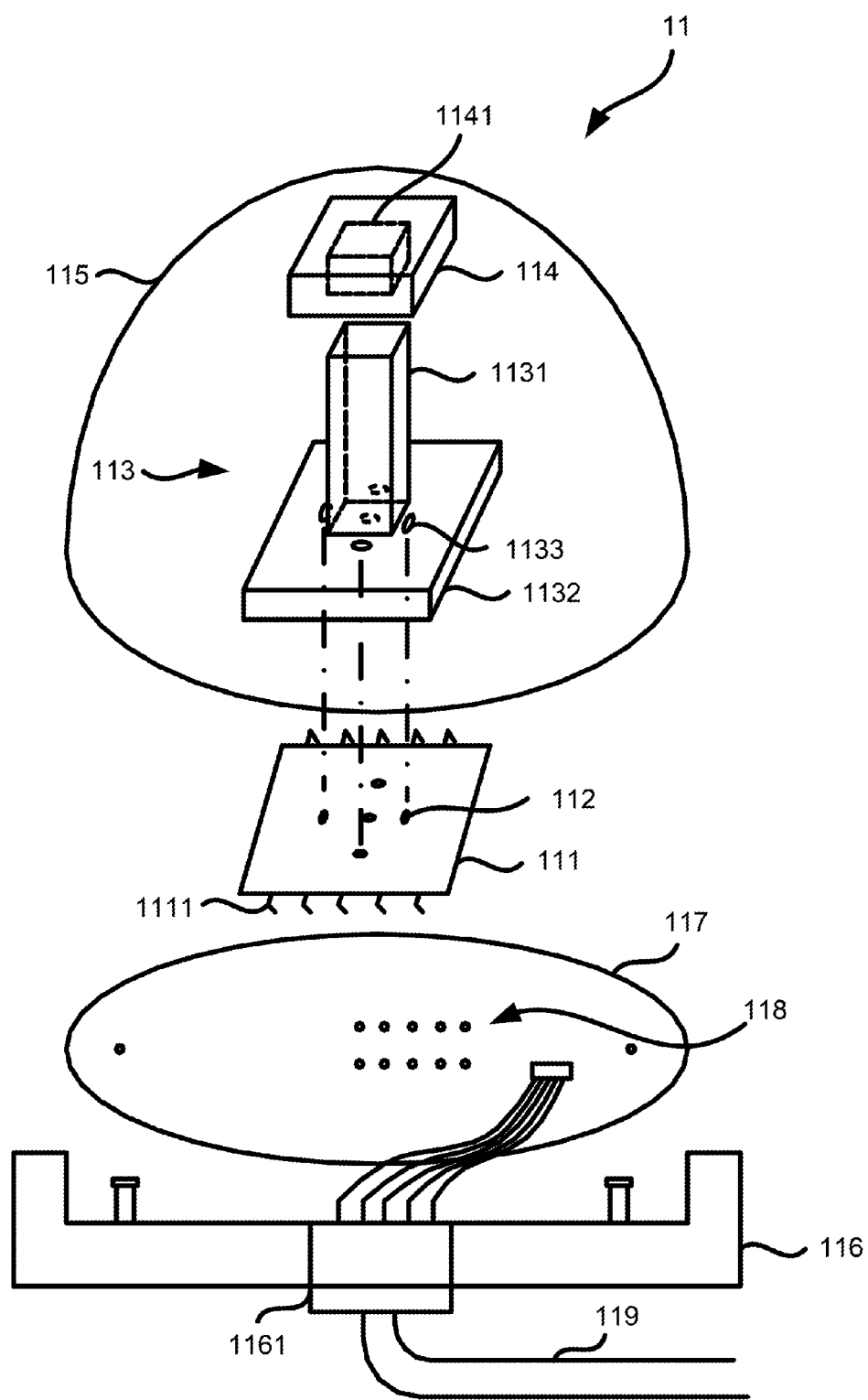
FIG. 1 is a perspective view of a sunlight-detecting unit according to the preferred embodiment of the present invention.

Referring to FIG. 1, the sunlight-detecting unit 11 includes a base 116, a circuit board 117 provided on the base 116, an integrated circuit ("IC") 111 provided on the circuit board 117, a column set 113 provided on the IC 111, a hat 114 mounted on the column set 113 and a transparent cover 115 provided on the base 116 for covering the circuit board 117, the IC 111, the column set 113 and the hat 114 and for allowing the sunlight to reach the IC 111.

The base 116 is made of aluminum alloy. A waterproof joint 1161 is disposed in an aperture defined in the base 116. A wire 119 is provided between the waterproof joint 1161 and the control unit 2.

The circuit board 117 is connected to the waterproof joint 1161. The circuit board 117 includes ten sockets 118 provided thereon.

The IC 111 includes five pins 1111 extended from an edge, five pins 1111 extended from an opposite edge and five photo diodes 112 provided on the top. The pins 1111 are inserted in the sockets 118. The photo diodes 112 include a central diode 112, an eastern diode 112, a western diode 112, a southern diode 112 and a northern diode 112. Each of the diodes 112 is connected to two related ones of the pins 1111.

The column set 113 includes a column 1131 supported on a plate 1132. The plate 1132 includes four apertures 1133 defined therein. The plate 1132 is provided on the IC 112 so that the apertures 1133 are aligned to the photo diodes 112. The ratio of the diameter of the apertures 1133 to the height of the column 1131 is lower than 1. The ratio of the diameter of the apertures 1133 to the thickness of the plate 1132 is higher than 1.

The hat 114 includes a space 1141 defined in the bottom for receiving the column 1131. The ratio of the thickness of the hat 114 to the diameter of the apertures 1133 is lower than 1.

The transparent cover 115 is in hemi-spherical.

The control unit 12 includes an analog signal processor 121, a microprocessor 122 and a direct circuit ("DC") motor-driving circuit 123. The analog signal processor 121 is connected to the circuit board 117. The analog signal processor 121 amplifies the signals, filters noises from the signals, matches the impedances and adjusts the gains of the signals.

The analog signal processor 121 may be a differential amplifier.

The microprocessor 122 controls the operation of the solar tracker so that the solar cell array 15 always intercepts the sunlight perpendicularly.

The DC motor-driving circuit 123 is connected to the first motor 13 so that the former can energize the latter to rotate in opposite directions. On the other hand, the DC motor-driving circuit 123 is connected to the second motor 14 so that the former can energize the latter to rotate in opposite directions.

Figure 4:
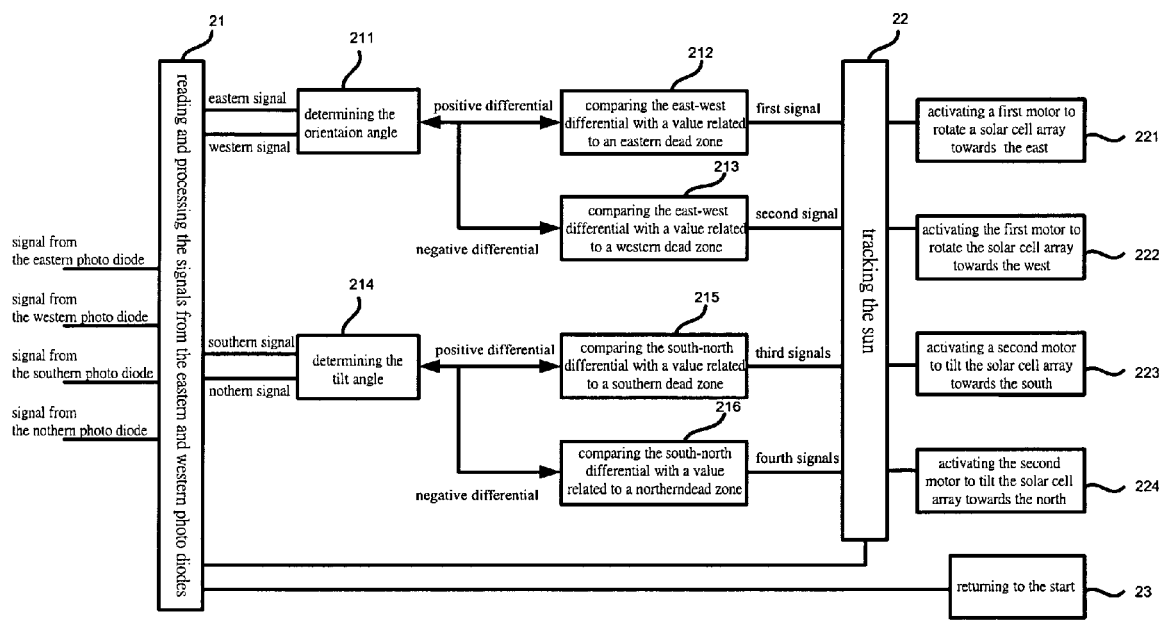
FIG. 4 is a flow chart of a process used in the solar tracker shown in FIG. 3.
Figure 5:
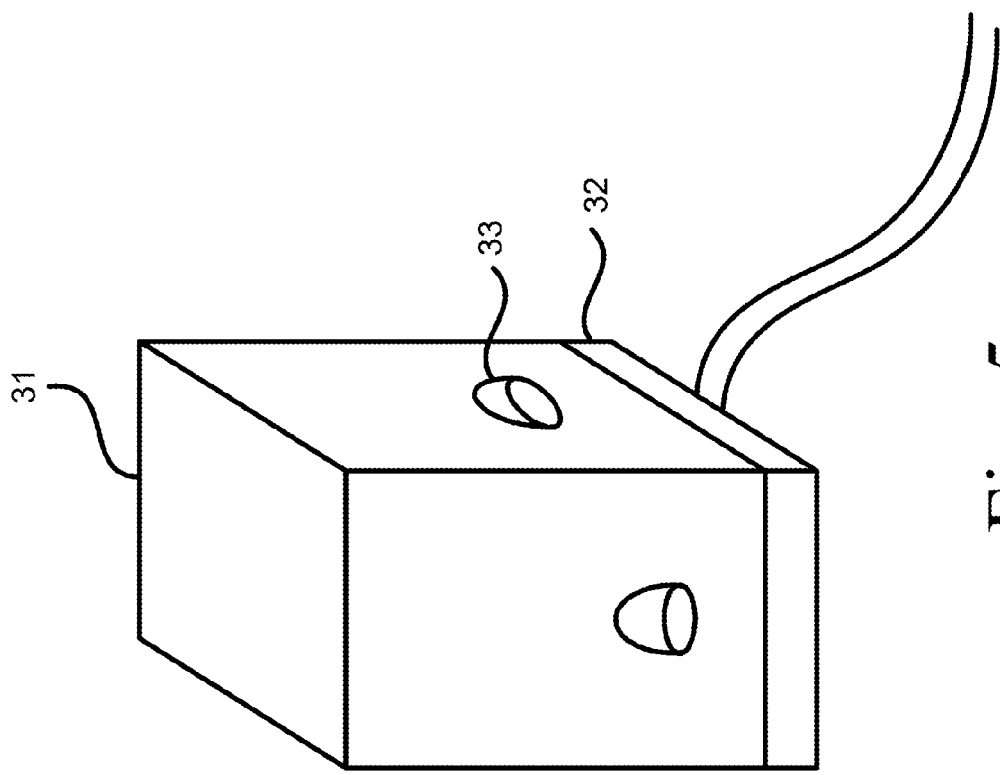
FIG. 5 is a perspective view of a conventional solar tracker.

Referring to FIGS. 3 and 4, there is shown a process executed by the solar tracker 1.

At 21, the analog signal processor 121 of the control unit 12 processes the signals from the east, west, southern, and northern photo diodes 112.

At 211, the differential between the signals from the eastern and western photo diodes 112 is calculated. In specific, the intensity of the signal from the west photo diode 112 is subtracted from the intensity of the signal from the east photo diode 112.

If the sun is closer to the east than to the west, the hat 114 will cast shadow on the west photo diode 112. The intensity of the signal from the east photo diode 112 will be higher than the intensity of the signal from the west photo diode 112. The east-west signal differential will be positive. In this case, the process goes to 212.

If the sun is closer to the west than to the east, the hat 114 will cast shadow on the east photo diode 112. The intensity of the signal from the east photo diode 112 will be lower than the intensity of the signal from the west photo diode 112. The east-west signal differential will be negative. In this case, the process goes to 213.

At 212, it is determined if the solar cell array 15 is in the eastern dead zone by comparing the east-west signal differential with a value corresponding to the eastern dead zone. If the solar cell array 15 is not in the eastern dead zone, a first signal will be provided.

At 213, it is determined if the solar cell array 15 is in the western dead zone by comparing the east-west signal differential with a value corresponding to the western dead zone. If the solar cell array 15 is not in the western dead zone, a second signal will be provided.

If the solar cell array 15 is not in the eastern nor western dead zone, the process will go back to 211 after providing the first or second signal.

At 214, the differential between the signals from the southern and northern photo diodes 112 is calculated. In specific, the intensity of the signal from the north photo diode 112 is subtracted from the intensity of the signal from the south photo diode 112.

If the sun is closer to the south than to the north, the south photo diode 112 will be exposed to the sunlight and the hat 114 will cast shadow on the north photo diode 112. The intensity of the signal from the south photo diode 112 will be higher than the intensity of the signal from the north photo diode 112. The south-north signal differential will be positive. In this case, the process goes to 215.

If the sun is closer to the north than to the south, the north photo diode 112 will be exposed to the sunlight and the hat 114 will cast shadow on the south photo diode 112. The intensity of the signal from the south photo diode 112 will be lower than the intensity of the signal from the north photo diode 112. The south-north signal differential will be negative. In this case, the process goes to 216.

At 215, it is determined if the solar cell array 15 is in the southern dead zone by comparing the south-north signal differential with a value corresponding to the southern dead zone. If the solar cell array 15 is not in the southern dead zone, a third signal will be provided.

At 216, it is determined if the solar cell array 15 is in the northern dead zone by comparing the south-north signal differential with a value corresponding to the northern dead zone. If the solar cell array 15 is not in the northern dead zone, a fourth signal will be provided.

If the solar cell array 15 is not in the southern nor northern dead zone, the process will go back to 214 after providing the third or fourth signal.

At 22, it is determined if the brightness of the sunlight is larger than a predetermined value. If so, the solar tracker 1 will operate to direct the solar cell array 15 to the sun. Otherwise, the solar tracker 1 will stop.

At 221, on receiving the first signal, the control unit 12 instructs the first motor 13 to rotate the solar array 15 towards the east. The first motor 13 will be stopped if the solar array 15 is in the eastern dead zone.

At 222, on receiving the second signal, the control unit 12 instructs the first motor 13 to rotate the solar cell array 15 towards the west. The first motor 13 will be stopped if the solar array 15 is in the western dead zone.

At 223, on receiving the third signal, the control unit 12 instructs the second motor 14 to tilt the solar cell array 15 towards the south. The second motor 14 will be stopped if the solar array 15 is in the southern dead zone.

At 224, on receiving the fourth signal, the control unit 12 instructs the second motor 14 to tilt the solar array 15 towards the north. The second motor 14 will be stopped if the solar array 15 is in the northern dead zone.

At 23, the process goes back to the start. The east-west view angle of the solar tracker 1 is 180 degrees. When the solar cell array 15 is directed to the west but the sun is in the east, the solar tracker 1 cannot track the sun. Therefore, the process must be reinitiated so that the solar tracker 1 directs the solar cell array 15 back to the east and north. When the sun sets, the process must be reinitiated so that the solar tracker 1 directs the solar cell array 15 back to the east and north.

When the east-west signal differential is in the eastern or western dead zone and the south-north signal differential is in the southern or northern dead zone, the solar cell array 15 is directed to the sun.

When the sun moves a little, the shadow cast by the hat 114 mounted on the column set 113 moves accordingly and changes the brightness of the light detected by each of the photo diodes 112. Therefore, the intensities of the signals provided by the photo diodes 112 are changed. These data are provided to the control unit 12 that instructs the motors 13 and 14 to direct the solar cell array 15 to the sun. Therefore, the solar tracker 1 is precise, inexpensive and reliable and consumes a little energy.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A solar tracker comprising:
   a sunlight-detecting unit comprising
      a base;
      a waterproof joint inserted through the base;
      a circuit board connected to the waterproof joint and formed with ten sockets;
      an integrated circuit comprising ten pins inserted in the sockets and four photo diodes provided thereon for detecting sunlight and providing according signals;
      a plate provided on the integrated circuit;
      a column provided on the plate;
      a hat mounted on the column;
      a transparent cover provided on the base for covering the circuit board, the integrated circuit, the plate, the column and the hat;
   a control unit connected to the waterproof joint;
   a first motor for rotating a solar cell array under control of the control unit; and
   a second motor for tilting the solar cell array under control of the control unit.

2. The solar tracker according to claim 1, wherein the plate comprises four apertures directed to the photo diodes.

3. The solar tracker according to claim 2, wherein the ratio of the diameter of the apertures to the height of the column is lower than 1.

4. The solar tracker according to claim 2, wherein the ratio of the diameter of the apertures to the thickness of the plate is larger than 1.

5. The solar tracker according to claim 2, wherein the ratio of the diameter of the apertures to the height of the hat is smaller than 1.

6. The solar tracker according to claim 1, wherein the hat comprises a space for receiving the column.

7. The solar tracker according to claim 1, wherein the photo diodes are respectively located on the integrated circuit at geographic positions which correspond to east, west, south, and north, respectively, when the solar tracker is installed in a position to track the sun, and each of the photo diodes is connected to related ones of the pins.

8. The solar tracker according to claim 1, wherein the transparent cover is hemi-spherical.

9. The solar tracker according to claim 1, wherein the base is made of aluminum alloy.

10. The solar tracker according to claim 1, wherein the view angle of the sunlight-detecting unit is 180 degrees.

11. The solar tracker according to claim 1, wherein the control unit comprises:
   an analog signal processor for amplifying the signals, filtering noises from the signals, adjusting the gains of the signals and matching impedances;
   a direct circuit motor-driving circuit connected to the first and second motors; and
   a microprocessor connected to the analog signal processor and the direct circuit motor-driving circuit for controlling of the solar tracker.

12. The solar tracker according to claim 11, wherein the analog signal processor is a differential amplifier.

13. The solar tracker according to claim 7, wherein the control unit executes a process comprising the steps of:
   reading and processing the signals;
   tracking the sun if the brightness of the sun is higher than a predetermined value and stop tracking the sun if otherwise;
   returning to the start when the solar cell array is directed to the west but the sun is in the east and when the sun sets.

14. The solar tracker according to claim 13, wherein the step of reading and processing the signals comprises the steps of:
   calculating the differential between the signals from the eastern and western photo diodes;
   if the east-west signal differential is positive, determining if the solar cell array is in an eastern dead zone, and providing a first signal if the solar cell array is not in the eastern dead zone;
   if the east-west signal differential is negative, determining if the solar cell array is in a western dead zone, and providing a second signal if the solar cell array is not in the western dead zone;
   returning to the step of calculating the east-west signal differential if the solar cell array is not in any of the eastern and western dead zones after providing one of the first and second signals;
   calculating the differential between the signals from the southern and northern photo diodes;
   if the south-north signal differential is positive, determining if the solar cell array is in a southern dead zone, and providing a third signal if the solar cell array is not in the southern dead zone;
   if the south-north signal differential is negative, determining if the solar cell array is in a northern dead zone, and providing a fourth signal if the solar cell array is not in the northern dead zone; and
   returning to the step of calculating the south-north signal differential after providing one of the third and fourth signals.

15. The solar tracker according to claim 14, wherein the solar cell array is directed to the sun when it is in one of the east and western dead zones and one of the southern and northern dead zones.

16. The solar tracker according to claim 14, wherein the operation of the first motor and the moderation of the second motor are conducted alternately so that the solar cell array is directed to the sun.

17. The solar tracker according to claim 14, wherein the step of tracking the sun comprises the steps of:
   on receiving the first signal, activating the first motor to rotate the solar array towards the east;
   on receiving the second signal, activating the first motor to rotate the solar cell array towards the west;
   on receiving the third signal, activating the second motor to tilt the solar cell array towards the south; and
   on receiving the fourth signal, activating the second motor to tilt the solar array towards the north.

18. The solar tracker according to claim 13, wherein the solar cell array is rotated to the east and tilted to the north at the start.

* * * * *